UNITED STATES PATENT OFFICE.

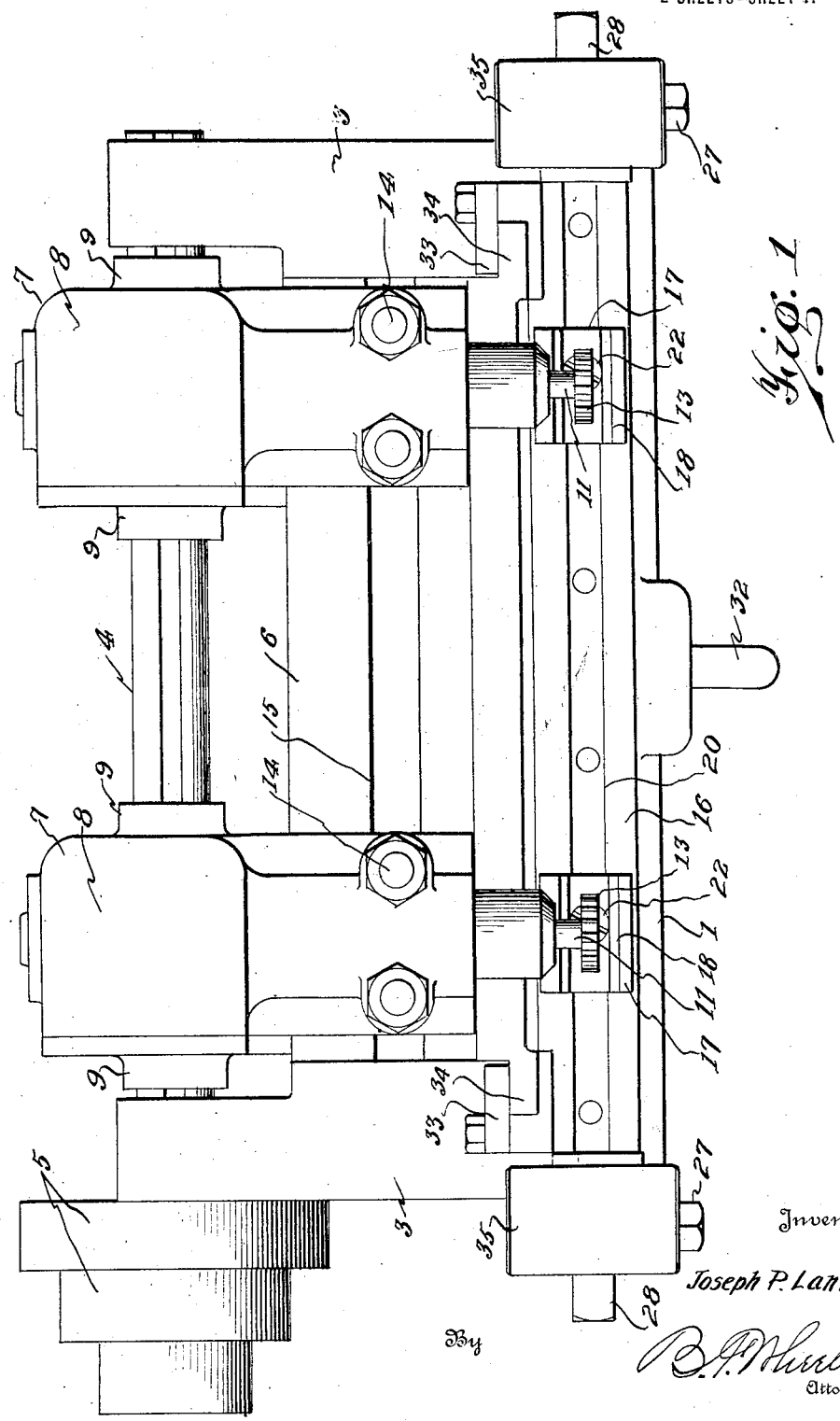

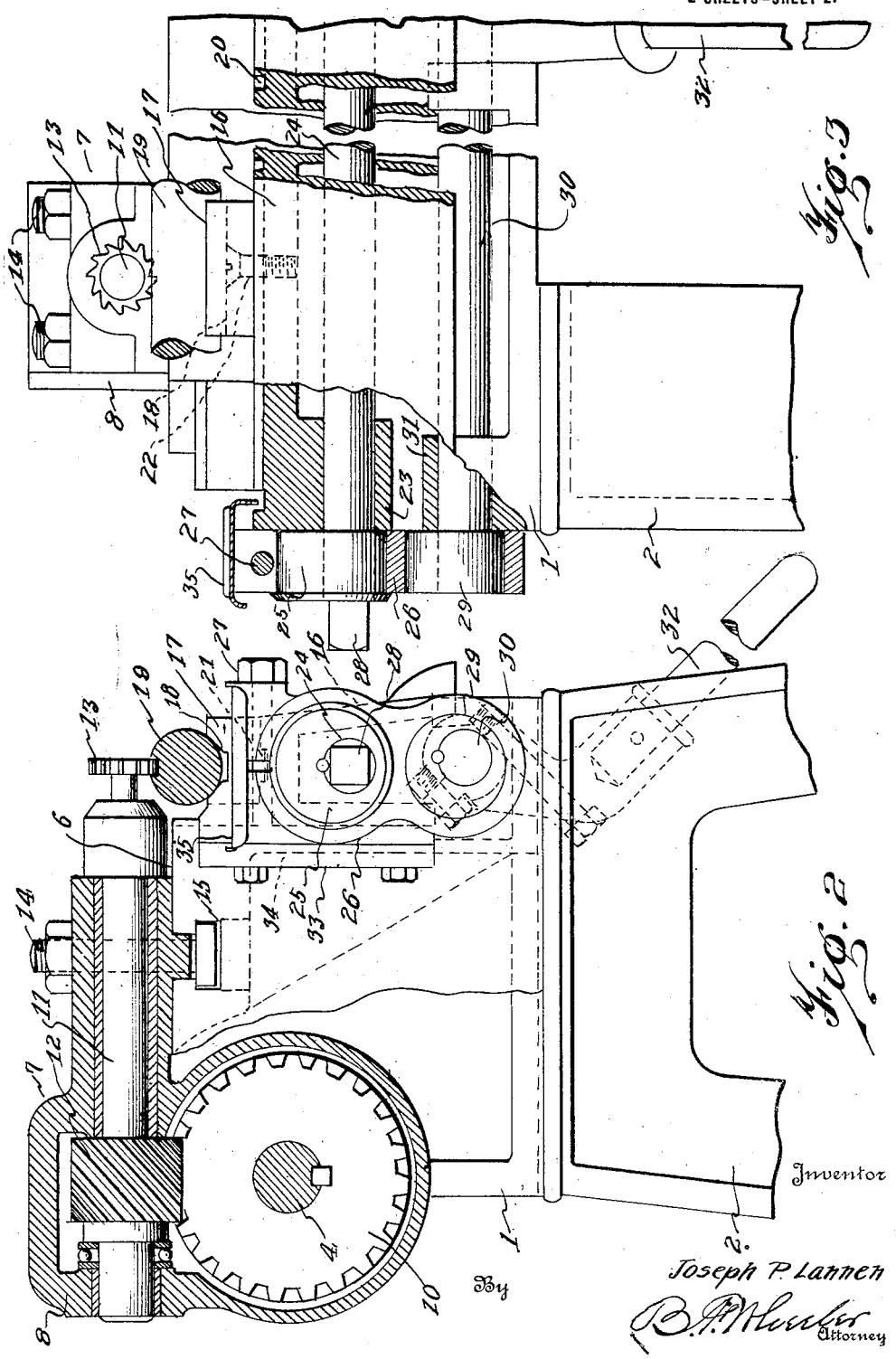

JOSEPH P. LANNEN, OF DETROIT, MICHIGAN.

KEY-SEATING MACHINE.

1,372,886.　　　　　　Specification of Letters Patent.　　Patented Mar. 29, 1921.

Application filed March 26, 1920.　Serial No. 368,907.

*To all whom it may concern:*

Be it known that I, Joseph P. Lannen, a citizen of the United States, residing at Detroit, in the county of Wayne and State of Michigan, have invented a new and useful Key-Seating Machine, of which the following is a specification.

This invention relates to key-seating machines such as are employed to form keyways in shafts, and particularly relates to machines for forming key-ways for receiving Woodruff keys.

It is the object of the invention to provide a key-seating machine having a table for supporting the work, and making provision for adjusting said table according to the size of the shaft to be machined, and further providing for a separate feed adjustment of the table to control the depth to which the key-way is cut.

A further object is to provide for the simultaneous operation of a plurality of key-way cutters, working upon the same shaft, and to provide for relatively adjusting said cutters to establish the desired spaced relation between the key-seats formed thereby.

In attaining these objects, the invention contemplates a frame or base and a plurality of relatively adjustable units thereupon, each comprising a key-way cutter and drive mechanism for the same, and a work table for receiving a shaft to be acted upon by said cutters, adjustable to or from the cutters by means of two connected eccentrics, one of which is adjustable according to the size of the shaft to be machined while the other is actuable to effect the feed of the shaft to the cutters and thus controls the depth of the key-seats.

A preferred embodiment of the invention is described in the following specification and is illustrated in the accompanying drawing, wherein, Figure 1 is a plan view of the improved machine.

Fig. 2 is an end view of the same showing one of the adjustable cutter units in section.

Fig. 3 is a fragmentary view in side elevation and partial section, showing an end portion of the machine, including one of the cutter units.

In these views the reference character 1 designates a frame supported by legs 2 at a suitable elevation, said frame having at its extremities bearings 3 in which a drive shaft 4 is journaled. At one end of the frame said shaft is sufficiently extended to carry suitably stepped drive pulleys 5. The frame has a portion 6 extending between the bearings 3 and forming a table for partially supporting a plurality of cutting units 7, each comprising a housing 8, having bearings 9 in which the shaft 4 is journaled, a spiral gear 10 splined upon said shaft within said housing, a shaft 11 journaled in said housing transversely of the shaft 4, a spiral pinion 12 driving said shaft from the gear 10, and a key-way cutter 13 mounted fast on an end portion of the shaft 11 projecting from the housing 8 above the front portion of the frame 1. Thus it is seen that each unit 7 is jointly supported by the table 6 and drive shaft 4, and is slidable longitudinally of the frame upon both of these supports, maintaining a drive to the cutter 13 in any of its positions of longitudinal adjustment. To rigidly maintain any desired positions of the units, each of the same is engaged by a pair of clamping bolts 14, the heads of which engage in an undercut slot 15 formed in the table 6.

At 16 is indicated the work-supporting table, the same being arranged at the front of the machine beneath the cutters 13, and preferably extending the full length of the frame 1. Instead of mounting the work directly upon said table, it is preferred to secure upon the table one or more blocks 17 having V-shaped grooves 18 in their top faces to accommodate the shaft such as is indicated at 19, in which key-seats are to be formed. The table 16 is grooved as indicated at 20 to receive tongues 21 depending from the blocks 17, whereby perfect alinement of the grooves 18 is insured, and clamping screws 22 serve to hold the blocks rigidly in the desired positions of adjustment. At its ends the table 16 is formed with depending bearings 23 in which a rock-shaft 24 is journaled. Said shaft projects beyond said bearings and rigidly carries an eccentric 25 adjacent each bearing. Each eccentric is mounted in the upper portion of an adjustable yoke bearing 26, said portion being split and the split parts being normally clamped into rigid engagement with the eccentric 25 by a bolt 27. Thus when said bolt is tightened there can be no relative rotation between each eccentric 25 and the corresponding yoke bearing 26. When said bolt is loosened, however, the shaft 24 may be rocked to turn the eccentric 25 in the respective bearings 26, the ends of said shaft being squared as shown at 28 for engagement by a wrench or the like to effect rocking. The lower portions of the adjustable yoke bearings 26 are engaged by and supported upon eccentrics 29 mounted fast upon the respective ends of a rock-shaft 30 which is journaled in bearings 31 formed respectively upon the ends of the frame 1. At an intermediate point a lever 32 is clamped upon the shaft 30 to rock the same. To constrain the work-table 16 to a vertical movement when either of the pairs of eccentrics 25 or 29 are actuated, guide plates 33 are bolted to the ends of the table so as to snugly embrace flanges 34 projecting from each end of the frame 1. Each of the bearings 26 is preferably protected by a plate or shield 35 which will deflect from said bearing any cuttings that may be thrown thereon by the cutters while the same are in use.

In the operation of the above described machine, the heads 7 are first adjusted longitudinally of the frame 1 to insure the key-seats being formed in the shaft 19 in the desired spaced relation. The bolts 27 are then loosened and the shaft 24 and eccentrics 25, fast thereupon, are rocked (by the application of a suitable tool to one of the squared ends 28) until the table is adjusted a proper distance beneath the cutters to accommodate beneath the latter a shaft (as 19) engaging the blocks 17. This distance having been established, the bolts 27 are again tightened to clamp the eccentrics 25 in the yoke bearings 26, and this adjustment is thus maintained while the machine is operating upon any number of shafts of the same thickness. Feeding of the work against the cutters is accomplished by rocking the shaft 30 and eccentrics 29 thereupon by means of the lever 32, said eccentrics actuating the yoke bearings 26 vertically, and consequently similarly shifting the work table 16 supported by said yoke bearings. The depth of cut is proportionate to the angular movement of the lever 32, and may be accurately controlled, therefore, by properly limiting the swing of the lever.

The described machine is adapted to handle large quantities of work with great accuracy and rapidity, and can quickly be adjusted to vary the longitudinal spacing of the key-ways or to compensate for changes in the thickness of the work.

What I claim is:

1. In a key-seating machine, the combination with a cutter and means for driving the same, of a work-supporting table arranged beneath said cutter, mechanism for adjusting the table vertically to feed the work to the cutter, and an eccentric mechanism for effecting a separate vertical adjustment of the table and for maintaining said adjustment with relation to the first mentioned adjusting mechanism.

2. In a key-seating machine, the combination with a cutter and means for driving the same, of a work-supporting table arranged beneath said cutter, a rock-shaft journaled in and supporting said table, eccentrics carried by said rock-shaft, bearings respectively engaging said eccentrics, means for fixing said eccentrics non-rotatively in said bearings in various positions of adjustment, and a common means for shifting said bearings vertically to feed the work to the cutter.

3. In a key-seating machine, the combination with a cutter and means for driving the same, of a work-supporting table arranged beneath said cutter, a rock-shaft journaled in and supporting said table, an eccentric fast upon said rock-shaft, a bearing engaging said eccentric, means for fixing said eccentric in said bearing, a second eccentric engaging said bearing, a rock-shaft carrying said second eccentric, and means for rocking said second rock-shaft to rotate said second eccentric in said bearing and feed the table vertically.

4. In a key-seating machine, the combination with a cutter and means for driving the same, of a work-supporting table arranged beneath said cutter, bearings carrying said table, means for adjusting the table vertically with respect to said bearings, a rock-shaft, eccentrics mounted fast upon said rock-shaft respectively loosely engaging said bearings, and actuating means for said rock-shaft for rocking the eccentrics to raise the table to feed the work to the cutter.

In testimony whereof I sign this specification.

JOSEPH P. LANNEN.